United States Patent [19]

Brushaber

[11] Patent Number: 4,736,603

[45] Date of Patent: Apr. 12, 1988

[54] MARINE DRIVE UNIT ANTI-THEFT DEVICE

[76] Inventor: Donald Brushaber, 221 Hayes Ct., Normandy Beach, N.J. 08739

[21] Appl. No.: 667,547

[22] Filed: Nov. 2, 1984

Related U.S. Application Data

[63] Continuation-in-part of Ser. No. 400,920, Jul. 22, 1982, abandoned.

[51] Int. Cl.$^4$ .................. F16B 41/00; E05B 63/14; E05B 65/36; B63H 19/00
[52] U.S. Cl. .................. 70/232; 440/113; 70/237; 70/363; 109/64
[58] Field of Search ......... 70/229, 232, 237, DIG. 57, 70/363; 411/910, 911, 116, 117, 119, 122, 123, 129, 131; 440/113; 74/523; 248/552, 551, 553; 109/64

[56] References Cited

U.S. PATENT DOCUMENTS

| 525,431 | 9/1894 | Sparks | 411/120 |
|---|---|---|---|
| 1,346,907 | 7/1920 | Munson | 411/120 |
| 2,316,695 | 4/1943 | Jaffa | 411/910 |
| 3,060,786 | 10/1962 | Flower | 70/232 |
| 3,095,727 | 7/1963 | Kerr | 70/451 |
| 3,303,720 | 2/1967 | Scherbing | 70/363 |
| 3,316,742 | 5/1967 | Wellekens | 70/379 |
| 3,415,086 | 12/1968 | Trainor | 70/240 |
| 3,477,607 | 11/1969 | Fuzzell et al. | 70/232 |
| 3,600,026 | 8/1971 | Savio | 70/DIG. 57 |
| 3,665,739 | 5/1972 | Boll | 70/237 |
| 3,693,383 | 9/1972 | Krupen et al. | 70/232 |
| 3,747,541 | 7/1973 | Reese | 109/64 |
| 3,765,197 | 10/1973 | Foote | 70/58 |
| 3,771,338 | 11/1973 | Raskin | 70/DIG. 57 |
| 3,871,284 | 3/1975 | Krise | 109/64 |
| 3,875,985 | 4/1975 | Okuda | 411/120 |
| 3,910,079 | 10/1975 | Gassaway | 70/DIG. 57 |
| 4,078,405 | 3/1978 | Steinbach | 70/363 |
| 4,094,173 | 6/1978 | Brown | 70/232 |
| 4,136,541 | 1/1979 | Gramlich | 70/231 |
| 4,223,799 | 9/1980 | Eyster et al. | 70/276 |
| 4,231,241 | 11/1980 | Lipski | 70/195 |
| 4,325,237 | 4/1982 | Menzie | 70/237 |
| 4,325,701 | 4/1982 | Peters et al. | 70/232 |
| 4,358,941 | 11/1982 | Zimmer | 411/910 |
| 4,438,642 | 3/1984 | DeJong | 70/232 |
| 4,444,031 | 4/1984 | Watson | 70/232 |
| 4,557,458 | 12/1985 | Vahlberg et al. | 70/232 |

Primary Examiner—Gary L. Smith
Assistant Examiner—Vinh Luong
Attorney, Agent, or Firm—Samuelson & Jacob

[57] ABSTRACT

An anti-theft device for a marine drive unit includes a cupped member for location around a threaded fastener which secures the drive unit in place so as to enable a blocking device to be secured in position to block access to the threaded fastener and thereby preclude unauthorized removal of the threaded fastener and the drive unit, the cupped member having outer surfaces lying in mutually perpendicular planes forming a corner complementary to a corner of the drive unit to preclude rotation of the cupped member when seated in the corner of the drive unit in order further to prevent unauthorized rotation of the threaded fastener.

12 Claims, 2 Drawing Sheets

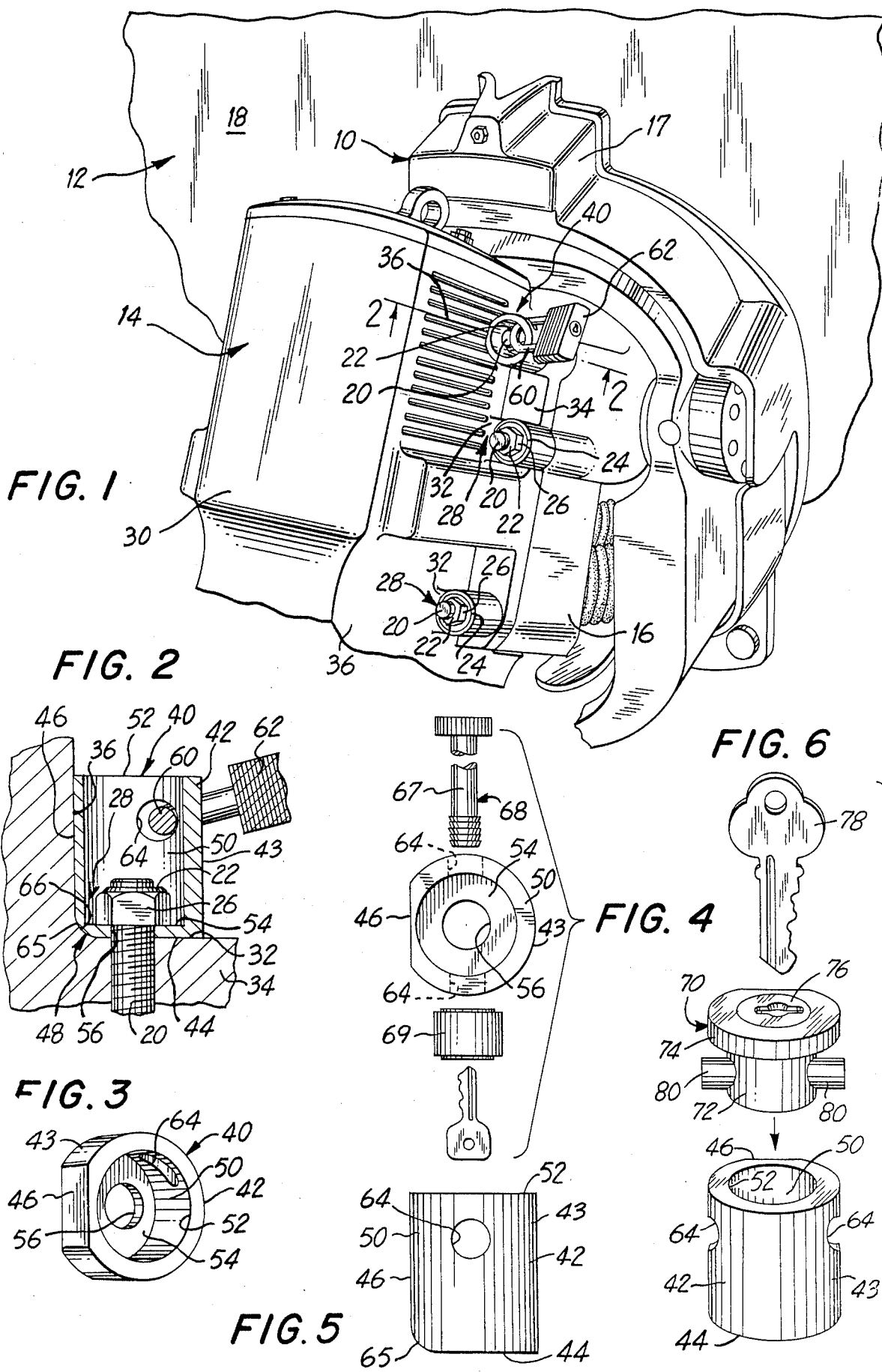

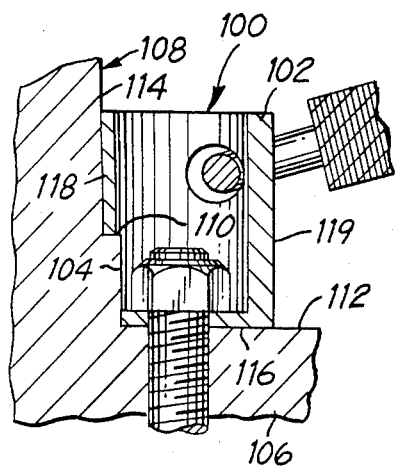
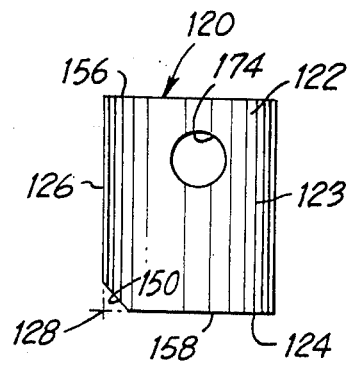
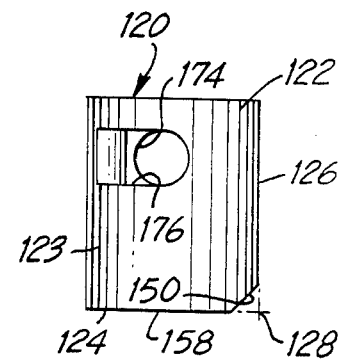
FIG. 7   FIG. 8   FIG. 9
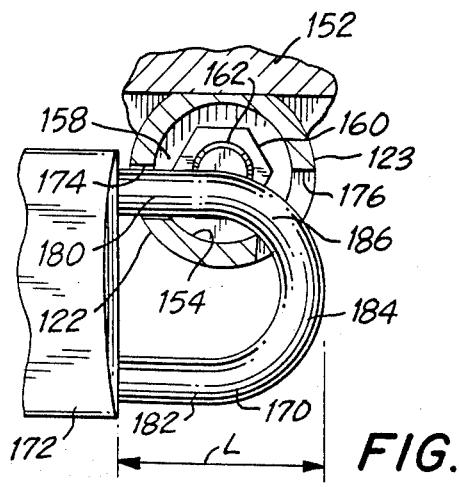
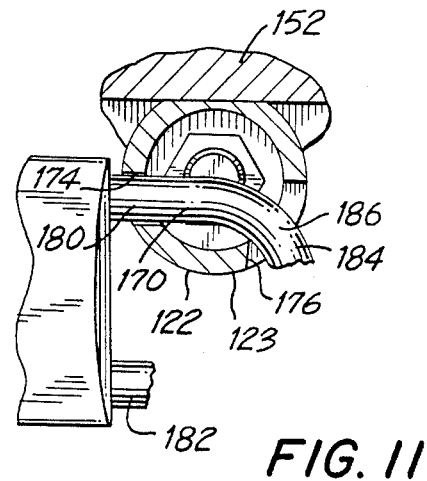
FIG. 10   FIG. 11
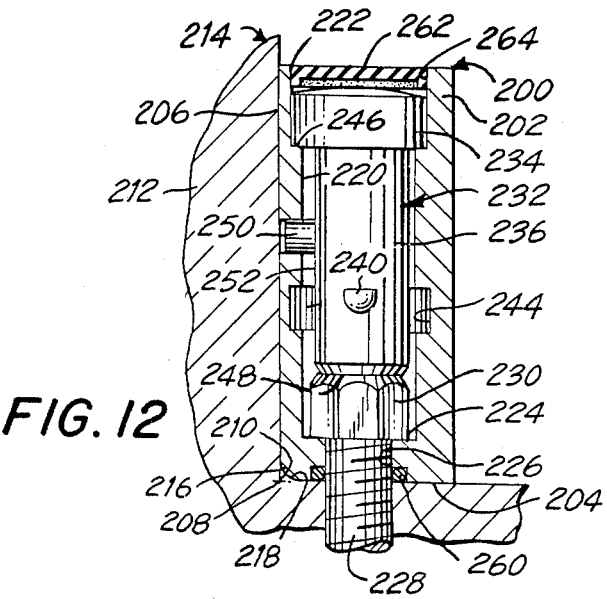
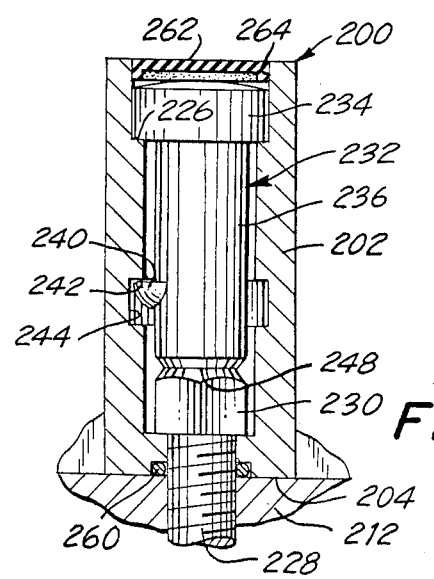
FIG. 12   FIG. 13

MARINE DRIVE UNIT ANTI-THEFT DEVICE

This application is a continuation-in-part of application Ser. No. 400,920, filed July 22, 1982 now abandoned.

The present invention relates generally to anti-theft devices and pertains, more specifically, to an anti-theft device for use in connection with the drive unit of an inboard-outboard marine propulsion system.

Inboard-outboard marine propulsion systems in common use employ a power unit located within the hull of a boat, adjacent the transom of the hull, and a drive unit outside the hull, secured in the propulsion system at the transom by threaded studs. In recent years, the theft of such drive units has become more prevalent, encouraged, perhaps, by the ease with which the threaded connections provided by the studs may be dismantled for removal of the drive units.

It is an object of the present invention to provide an anti-theft device particularly suited to installation in connection with the drive unit of an inboard-outboard marine propulsion system to deter theft of the drive unit.

Another object of the invention is to provide an anti-theft device of the type described and which is installed easily and quickly without requiring modification of the drive unit itself.

Still another object of the invention is to provide an anti-theft device of the type described and which utilizes structural characteristics of the drive unit itself to enable effective operation of the anti-theft device, while allowing simplified construction of the component parts of the anti-theft device.

Yet another object of the invention is to provide an anti-theft device of the type described and which is relatively inexpensive in construction and easy to install and use.

A further object of the invention is to provide an anti-theft device of the type described and which may remain in place during use of the propulsion system without disturbing the installation or the anti-theft device.

A still further object of the invention is to provide an anti-theft device of the type described and which is removed easily for authorized dismantling of the propulsion system.

Yet a further object of the invention is to provide an anti-theft device of the type described and which is constructed to withstand corrosion as well as other effects engendered by the conditions under which the device is used to enable a long and reliable service life.

The above objects, as well as still further objects and advantages, are attained by the present invention which may be described briefly as an anti-theft device for use in connection with the drive unit of an inboard-outboard marine propulsion system in which the drive unit is secured in the system by threaded fasteners susceptible to selective removal, at least one of which includes a threaded element having a wrenching configuration located closely adjacent a corner established between the planes of essentially flat, mutually perpendicular first and second surfaces of the drive unit, the corner including fillet means placed between the first and second surface, said anti-theft device comprising: a cupped member including a generally cylindrical shell having thereon an outer cylindrical surface portion, essentially flat, mutually perpendicular first and second outer surfaces lying in respective planes intersecting at a corner, and relief means located at said corner of the cupped member, said relief means including a relief configuration for accommodating said fillet means and rendering said corner of the cupped member so complementary to said corner of the drive unit as to assure seating of said shell within said corner of the drive unit, with said first and second outer surfaces of said shell fully contiguous, respectively, with said first and second surfaces of said corner of said drive unit so as to provide only limited access to said outer cylindrical surface portion, said limited access precluding effective gripping of said cupped member and unauthorized rotation thereof; a cavity including a generally cylindrical recess extending axially within the shell between an open top and a partially closed bottom, said first one of said outer surfaces being juxtaposed with said bottom and said second one of said outer surface extending along said shell essentially from said top to said bottom of said shell; an aperture extending axially through said bottom for receiving said one threaded fastener when said shell is seated within said corner of the drive unit with said first on of said outer surfaces located upon said first one of said surfaces of said corner of the power unit and said bottom clamped in place by said threaded element, the wrenching configuration located within said recess, and said second one of said outer surfaces engaging said second one of said surfaces of said corner of the power unit to prevent effective gripping access to said outer cylindrical surface portion and to preclude rotation of said cupped member relative to the power unit; said cavity including a configuration ordinarily enabling selective rotation of said threaded element within said recess, relative to said cupped member, by the engagement of an authorized rotating wrenching tool with said wrenching configuration; and selective access means in said cupped member located between said open top and said bottom, said selective access means being spaced from said bottom an axial distance sufficient to assure that said wrenching configuration will be located axially between said bottom and said selective access means such that access is blocked to said wrenching configuration by unauthorized wrenching tools which otherwise could engage said wrenching configuration and rotate said threaded element.

The invention will be understood more fully, while still further objects and advantages will become apparent in the following detailed description of preferred embodiments illustrated in the accompanying drawing, in which:

FIG. 1 is a pictorial view illustrating an anti-theft device constructed in accordance with the invention and installed upon the drive unit of an inboard-outboard marine propulsion system;

FIG. 2 is an enlarged cross-sectional view taken along line 2—2 of FIG 1;

FIG. 3 is a perspective view of the anti-theft device;

FIG. 4 is a top plan view of the anti-theft device, modified slightly to illustrate an alternate construction, together with an alternate blocking device;

FIG. 5 is a side elevational view of the modified device;

FIG. 6 is an exploded perspective view of another alternate construction;

FIG. 7 is a cross-sectional view similar to FIG. 2, but showing an alternate construction;

FIG. 8 is a side elevational view of another anti-theft device constructed in accordance with the invention;

FIG. 9 is a side elevational view of the side opposite to that illustrated in FIG. 8;

FIG. 10 is a top plan view, partially cross-sectioned, illustrating the anti-theft device of FIG. 8 installed;

FIG. 11 is a top plan view similar to FIG. 10, but showing the parts in another condition;

FIG. 12 is a longitudinal cross-sectional view of yet another anti-theft device constructed in accordance with the invention; and FIG 13 is a longitudinal cross-sectional view of the anti-theft device of FIG. 12, turned 90° about the longitudinal axis.

Referring now to the drawing, and especially to FIG. 1 thereof, an inboard-outboard marine propulsion system 10 is shown installed in the hull 12 of a small boat and includes a drive unit 14 which is coupled to a bracket 16 which itself is mounted upon a housing 17 of the inboard power unit of the propulsion system and is located outboard of the hull 12 at transom 18 of the hull. The drive unit 14 is coupled to the bracket 16 by means of threaded fasteners shown in the form of threaded studs 20 which receive threaded elements in the form of nuts 22 clamped against washers 24 to secure drive unit 14 in place. Each of the nuts 22 includes a wrenching configuration 26, and the location of the threaded fasteners places the nuts 22, and the wrenching configurations 26 thereof, closely adjacent a corresponding corner 28 in the housing 30 of the drive unit 14. Each corner 28 is formed by the intersection of planes within which there are a first surface 32 on a laterally-extending flange 34 of the housing 30 and a second surface 36 which extends generally perpendicular to the first surface 32. Nuts 22 are exposed and are easily accessible for wrenching and removal to enable dismantling of the propulsion system 10 by removal of the drive unit 14 from the bracket 16. It is this ease of removal, coupled with the value of the drive units, which has led to an increasing number of thefts of drive units over the years.

In order to deter the theft of drive unit 14, an anti-theft device 40, constructed in accordance with the invention, is shown in FIG. 1 installed in connection with the drive unit. As best seen in FIGS. 2 and 3, as well as in FIG. 1, anti-theft device 40 includes a cupped member in the form of a generally cylindrical shell 42 having an outer cylindrical surface portion 43 and outer surfaces 44 and 46 lying in planes which intersect at a corner 48 complementary to corner 28 of housing 30 of the drive unit 14 so that shell 42 is seated in corner 28. Shell 42 includes a cavity in the form of recess 50 extending axially from an open top 52 to a bottom 54, and an aperture 56 extends axially through the bottom 54 to enable threaded stud 20 to extend into recess 50. Nut 22 is located in recess 50 and is threaded onto stud 20, by means of a wrenching tool, such as a socket wrench (not shown), inserted into recess 50, and the bottom 54 is clamped to the housing 30, with outer surface 44 seated against complementary first surface 32 on flange 34, such that bottom 54 takes the place of a washer 24. At the same time, outer surface 46 of shell 42 is seated against second surface 36 of housing 30. In the illustrated arrangement, surfaces 32 and 36 of corner 28 are generally flat and mutually perpendicular and complementary surfaces 44 and 46 of corner 48 likewise are generally flat and mutually perpendicular.

Once the shell 42 is seated properly in corner 28, with nut 22 in place upon stud 20, a blocking device, here shown in the form of the shackle 60 of a common padlock 62 is passed through an opening 64 in the wall of the shell 42 to block access to the nut 22 by a wrenching tool. Opening 64 is located axially between open top 52 and bottom 54 and is spaced above bottom 54 a distance sufficient to allow shackle 60 to clear nut 22 and stud 20. When padlock 62 is locked in place, no wrenching tool is permitted access to nut 22 through recess 50 and unauthorized removal is precluded, thereby precluding theft of the drive unit 14.

It is noted that when shell 42 is seated properly in corner 28, outer surface 46, which extends along the entire length of shell 42 between the top 52 and bottom 54, is seated against complementary surface 36 of corner 28 of housing 30. In this manner, any rotation of shell 42 about the axis of rotation of nut 22 is precluded, thereby preventing any loosening of nut 22 through turning of the shell 42. To this end, outer surface 46 is generally flat so as to be fully complementary with corresponding second surface 36. In addition, relief means in the form of a small radius is provided at 65 to match the corresponding fillet means in the form of radius 66 in corner 28. The relief configuration provided by the relief means accommodates the fillet means to render the corner 48 of the cylindrical shell 42 so complementary to corner 28 of housing 30 as to assure seating of the shell 42 within corner 28 with the outer surfaces 44 and 46 fully contiguous with the corresponding surfaces 32 and 36 of the housing. This fully contiguous nesting of the shell 42 within the corner 28 protects against gripping of the cupped member for forced turning, or wedging a prying tool between the cupped and the housing for forced removal. The remaining cylindrical outer surface portion 43 is so limited in circumferential and is so inaccessible when the shell 42 is nested, as described, that any grasping or gripping of the nested shell which could turn the shell or break the shell from its nested position effectively is deterred. Thus, as long as padlock 62 is locked in place with shackle 60 passed through opening 64, nut 22 cannot be removed from stud 20 without extreme difficulty and theft of the drive unit is deterred.

In the modified version shown in FIGS. 4 and 5, a pair of openings 64 are provided in the wall of shell 42 and are aligned with one another so that the shackle of a padlock can be placed through the two openings 64 to span the recess 50 nearer the diameter thereof for closing off access to nut 22 to an even greater degree than in the embodiment which includes only one opening 64, in a manner similar to that illustrated in U.S. Pat. No. 4,094,173, wherein a vehicle lock includes a padlock shackle extending through opposed apertures in a cup member to close off access to a nut. Alternately, the bolt 67 of a chain lock 68 may be passed through the opposed openings 64 and locked in place by the key-operated locking device 69 of the chain lock 68, as shown in FIG. 4.

Turning now to FIG. 6, a further embodiment of the invention is seen in which the blocking device, rather than being an ordinary padlock or a chain lock, is in the form of a disk-like member 70 having an axially-extending cylindrical portion 72 complementary to the recess 50 in shell 42, and a radially-extending flange portion 74. A lock mechanism 76 is placed within disk-like member 70 and is operated by a key 78 to selectively extend or retract locking projections shown in the form of pins 80. Upon the retraction of pins 80, cylindrical portion 72 may be inserted into open top 52 of recess 50 until flange portion 74 is seated against the to of shell 42.

Key 78 is removed and recess 50 is fully closed against access to nut 22. Thus, shell 42 offers the versatility of use with standard available locks or with a specific lock designed to be integral with the shell 42.

Turning now to FIG. 7, an alternate construction is shown for the anti-theft device first depicted in FIGS. 1 and 2. In the anti-theft device 100 of FIG. 7, the shell 102 includes further relief means in the form of a notch 104 which provides a relief configuration compatible with the configuration of the housing 106 of the drive unit 108, the housing 106 including a shoulder 110 located at the corner formed by the planes of surfaces 112 and 114 of the housing 106. The placement of notch 104 at the corner formed by the planes of first and second outer surfaces 116 and 118 of the shell 102 renders the shell 102 so complementary to the corner formed by surfaces 112 and 114 of the housing 106 as to assure seating of the shell 102 within the corner, with the first and second outer surfaces 116 and 118 fully contiguous, respectively, with the corresponding surfaces 112 and 114 of the housing 106 and the limited remaining cylindrical outer surface portion 119 inaccessible for effective gripping or grasping.

Referring to FIGS. 8 through 11, another anti-theft device 120 is shown constructed in a fashion similar to the earlier-described devices in that a cylindrical shell 122 has an outer cylindrical surface portion 123 and outer surfaces 124 and 126 lying in mutually perpendicular planes which intersect at a corner 128. In this instance, relief means in the form of a chamfer 150 is provided at corner 128 to accommodate fillet means, such as the radius illustrated at 28 in FIG. 2, in housing 152 of the drive unit to which anti-theft device 120 will be secured.

As in the earlier-described embodiments shell 122 includes a cavity in the form of recess 154 extending axially from an open top 156 to a bottom 158. Once the shell 122 is seated properly within the corner of the housing 152, with a nut 160 in place upon a stud 162 in the drive unit, a blocking device is put in place to preclude access to nut 160, as described earlier. However, in this instance, the blocking device is in the form of a U-shaped shackle 170 of a common padlock 172, the shackle 170 passing through a first opening 174 in the wall of shell 122 and a second opening 176 spaced laterally from the first opening 174; that is, the second opening is located opposite the first opening so that the shackle 170 can pass through both openings 174 and 176.

The shackle 170 itself has a U-shaped configuration which includes straight portions 180 and 182 joined by a curved portion 184. The length L of the shackle 170, when padlock 172 is locked, is such that a part 186 of the curved portion 182 is located within opening 176. In order to enable the part 186 of curved portion 184 to lie within opening 176, as straight portion 180 passes through opening 174, opening 176 has a configuration which is elongated in a circumferential direction, as illustrated. Should the exposed straight portion 182 of shackle 170, or the exposed curved part of curved portion 184 be removed, as by cutting or filing away as shown in FIG. 11, in an attempt to forcibly release shackle 170 from shell 122 and gain unauthorized access to nut 160, straight portion 180 will remain captured within opening 174 and will continue to block access to nut 160 by virtue of the location of the inaccessible part 186 of curved portion 184 which lies within opening 176 and prevents unauthorized removal of the shackle 170 from the openings 174 and 176. Thus, the location and configuration of openings 174 and 176 add to the security provided by device 120 while enabling the use of a simple structure and a relatively inexpensive, commonly-available padlock. Limited access to the cylindrical surface portion 123 deters gripping or grasping of the shell 122 for unauthorized turning.

Yet another embodiment of the invention is illustrated in FIGS. 12 and 13. Anti-theft device 200 also includes a cupped member in the form of a shell 202 having outer surfaces 204 and 206 lying in planes which intersect at a corner 208 complementary to a corner 210 in the housing 212 of a drive unit 214. A chamfer 216 at corner 208 provides a relief configuration for accommodating a fillet 218 in the housing 212.

Shell 202 includes a cavity in the form a recess 220 extending axially from an open top 222 to a bottom 224, and an aperture 226 extends axially through the bottom 224 to enable a threaded stud 228 to extend into recess 220. Shell 202 is secured in place by a nut 230 threaded onto stud 228. Unauthorized access to nut 230 is precluded by a cylindrical lock 232 having a key-receiving head 234 and an axially-extending barrel 236. A latch 240 projects laterally from barrel 236 and is latched against a striker surface 242 provided by an undercut channel 244 in the wall of shell 202. In this manner, the latch 240 is placed inside the shell 202 to preclude unauthorized access to the latch 240. A shoulder 246 in the shell 202 further precludes access to the latch 240 when the lock 232 is in place. Preferably, the lower end 248 of the barrel 236 is located closely adjacent to, and even contiguous with, the top of the nut 230 to assure that axial movement of the barrel 236 relative to shell 202 is precluded once the latch 240 falls into the channel 244. Rotation of the barrel 235 relative to the shell 202 is precluded by a locking pin 250 which extends through the wall of the shell 202 to engage a rotation-precluding surface in the form of a flat surface 252 on the barrel 236. In this manner, lock 232 is actuated readily by an authorized key (not shown). The use of a locking pin 250, secured within the shell 202, and passing through the wall at the flat outer surface 206, renders the structure of shell 202 easy to manufacture, without sacrificing security. Thus, the recess 220 remains a simple cylindrical bore, while locking pin 250 is installed easily from outside the bore. Access to the locking pin 250 is precluded, when device 200 is installed, by virtue of the contiguity between flat surface 206 and the corresponding contiguous surface of the housing 212.

Sealing means in the form of an O-ring seal 260 is provided at the outer surface 204 for sealing the recess 220 against the entry of water through aperture 226. Further sealing means in the form of a cap 262 of resilient sealing material inserted into the recess 220 at 264 seals the recess against the entry of water through the otherwise open top 222 of the recess.

In all of the above-described embodiments, the simplified structure of each shell enables economical manufacture, as well as ease of installation and use. The configuration of each shell attains maximum theft protection without any modification of the drive unit itself. Installation is accomplished easily without requiring dismantling of the propulsion system. All that is required for installation is the removal of one nut and a corresponding washer, and then replacement of the nut after the bottom of the shell is seated on the housing in place of the removed washer. The complete nesting of the shell within the corner provided in the housing, coupled with only the limited exposed cylindrical portion of the outer surface of the shell, increases the difficulty of grasping or prying the shell to the point where theft effectively is deterred. Preferably, each shell is constructed of a material having high strength and corrosion resistance. One suitable material is stainless steel; however, other materials will be apparent to those skilled in the art of materials.

It is to be understood that the above detailed description of embodiments of the invention is provided by way of example only. Various details of design and construction may be modified without departing from the true spirit and scope of the invention as set forth in the appended claims.

The embodiments of the invention in which an exclusive property or privilege is claimed are defined as follows:

1. In an anti-theft device for use in combination with the drive unit of an inboard-outboard marine propulsion system in which the drive unit is secured in the system by threaded fasteners susceptible to selective removal, at least one of which includes a threaded element having a wrenching configuration located closely adjacent a corner established between the planes of essentially flat, mutually perpendicular first and second surfaces of the drive unit, the corner including fillet means placed between the first and second surfaces, the improvement comprising:

a cupped member including a generally cylindrical shell having thereon an outer cylindrical surface portion, essentially flat, mutually perpendicular first and second outer surfaces lying in respective planes intersecting at a corner, and a relief configuration located at said corner of the cupped member, said relief configuration accommodating said fillet means and rendering said corner of the cupped member so complementary to said corner of the drive unit as to assure seating of said shell within said corner of the drive unit, with said first and second outer surfaces of said shell fully contiguous, respectively, with said first and second surfaces of said corner of said drive unit so as to provide only limited access to said outer cylindrical surface portion, said limited access precluding effective gripping of said cupped member an unauthorized rotation thereof;

a cavity including a generally cylindrical recess extending axially within the shell between an open top and a partially closed bottom, said first one of said outer surfaces being juxtaposed with said bottom, and said second one of said outer surfaces extending along said shell essentially from said top to said bottom of said shell;

an aperture extending axially through said bottom for receiving said one threaded fastener when said shell is seated within said corner of the drive unit with said first one of said outer surfaces located upon said first one of said surfaces of said corner of the power unit and said bottom clamped in place by said threaded element, the wrenching configuration located within said recess, and said second one of said outer surfaces engaging said second one of said surfaces of said corner of the power unit to prevent effective gripping access to said outer cylindrical surface portion and to preclude rotation of said cupped member relative to the power unit;

said cavity including a configuration ordinarily enabling selective rotation of said threaded element within said recess, relative to said cupped member, by the engagement of an authorized rotating wrenching tool with said wrenching configuration; and selective access means in said cupped member located between said open top and said bottom, said selective access means being spaced from said bottom an axial distance sufficient to assure that said wrenching configuration will be located axially between said bottom and said selective access means such that access is blocked to said wrenching configuration by unauthorized wrenching tools which otherwise could engage said wrenching configuration and rotate said threaded element.

2. The invention of claim 1 wherein the relief configuration comprises a chamfer located between the first and second outer surfaces.

3. The invention of claim 1 wherein the relief configuration comprises a notch in said cylindrical shell.

4. The invention of claim 1 wherein said selection access means includes at least one laterally-extending opening in said cupped member, said opening being located between said open top and said bottom and communicating with said cavity such that a blocking device selectively may be placed in said opening and locked in place within within said cavity to clock access to said wrenching configuration by said unauthorized wrenching tools.

5. The invention of claim 1 wherein said selective access means includes a first laterally-extending opening in said cupped member, said first opening being located between said open top and said bottom and communcating with said cavity, and a second laterally-extending opening in said cupped member, said second opening being spaced laterally and circumferentially from the first opening and having a circumferentially elongate configuration elongated circumferentially to an extent greater than the circumferential extent of the first opening such that a blocking device in the form of a U-shaped shackle of a conventional padlock selectively may be passed through said first and second openings and locked in place within said cavity to block acccess to said wrenching configuration by said unauthorized wrenching tools, with a straight portion of the the shackle passing through said first opening and a curved portion of said shackle passing through said second opening to preclude unauthorized release of the shackle from said openings.

6. The invention of claim 1 wherein said selective access means includes:

a generally cylindrical lock selectively received within said cylindrical recess in a locking position wherein the lock extends axially between said open top and said threaded element located within said recess, said lock including a rotation-precluding surface and a laterally-projecting latch;

a striker surface enclosed within the cylindrical shell adjacent the cylindrical reces for receiving said latch when said lock is in said locking position; and a locking pin extending through said shell, from said second one of said outer surfaces into said cavity for engaging said rotation-precluding surface of said lock to preclude rotation of said lock relative to said shell.

7. The invention of claim 6 including bottom sealing means at said first one of said outer surfaces for sealing said cavity against the entry of water into said cavity through said aperture.

8. The invention of claim 6 including top sealing means at said top of said cavity for sealing said cavity against the entry of water into said cavity through said top.

9. The invention of claim 8 including bottom sealing means at said first one of said outer surfaces for sealing said cavity against the entry of water into said cavity through said aperture.

10. The invention of claim 1 including bottom sealing means at said first one of said outer surfaces for sealing said cavity against the entry of water into said cavity through said aperture.

11. The invention of claim 1 including top sealing means at said top of said cavity for sealing said cavity against the entry of water into said cavity through said top.

12. The invention of claim 11 including bottom sealing means at said first one of said outer surfaces for sealing said cavity against the entry of water into said cavity through said aperture.

* * * * *